(12) United States Patent
Sepúlveda

(10) Patent No.: US 8,714,658 B2
(45) Date of Patent: May 6, 2014

(54) HOPPER FOR TRANSPORTATION OF MINERAL OR AGGREGATES

(75) Inventor: Richard Cotal Sepúlveda, Santiago (CL)

(73) Assignee: Minetec S.A., Santiago (CL)

( * ) Notice: Subject to any disclaimer, the term of this patent is extended or adjusted under 35 U.S.C. 154(b) by 99 days.

(21) Appl. No.: 13/598,190

(22) Filed: Aug. 29, 2012

(65) Prior Publication Data
US 2013/0094904 A1  Apr. 18, 2013

(30) Foreign Application Priority Data
Oct. 12, 2011  (CL) .................................. 2538-2011

(51) Int. Cl.
*B60P 1/16* (2006.01)

(52) U.S. Cl.
USPC ................ 298/22 R; 298/1 B; 298/7; 298/24; 296/183.2

(58) Field of Classification Search
USPC ........... 298/7, 17 R, 22 R, 24, 1 B; 296/183.2
See application file for complete search history.

(56) References Cited

U.S. PATENT DOCUMENTS

| | | | |
|---|---|---|---|
| 3,413,032 A * | 11/1968 | Dendy | .......................... 298/8 H |
| D289,748 S | 5/1987 | Proeschl | |
| 6,520,590 B2 | 2/2003 | Azocar | |
| D578,038 S | 10/2008 | Kelley et al. | |
| D624,567 S | 9/2010 | Kelley | |
| D633,015 S | 2/2011 | Peltola et al. | |
| D635,157 S | 3/2011 | Rummer et al. | |
| D647,001 S | 10/2011 | Rajderkar et al. | |
| D657,718 S | 4/2012 | Zipfel et al. | |
| D660,756 S | 5/2012 | Peltola et al. | |

* cited by examiner

*Primary Examiner* — Stephen Gordon
(74) *Attorney, Agent, or Firm* — Andrew F. Young, Esq.; Lackenbach Siegel, LLP

(57) ABSTRACT

A hopper for transportation of mineral or aggregates which prevents the material from falling off due to movements or slope, and which improves load performance and facilitates the download. In the joining areas between the front and the floor and between the sides and the floor there are folded or cylindered pieces giving curvature to such joining points, thus adding anti-adherent features to this hopper. The front is folded with a wide radius, also achieving an anti-adherent feature. There are also folds in the front and the shield to avoid beams in those areas of the hopper, thus decreasing the total weight of such hopper and reducing the appearance of cracks and lessening the amount of welding. Additionally, the area of release is wider than the front and shield portions to allow for a better sliding of the material during unloading.

8 Claims, 2 Drawing Sheets

HOPPER FOR TRANSPORTATION OF MINERAL OR AGGREGATES

CROSS-REFERENCE TO RELATED APPLICATIONS

This application claims priority from Chile Patent Application No. CL 2538-2011 filed on Oct. 12, 2011 for "Hopper for Transportation of Minerals or Aggregates", the entire contents of which is incorporated herein by reference.

BACKGROUND OF THE INVENTION

1. Field of the Invention

The present invention relates to hoppers for mining trucks and aggregates in general, and the construction thereof.

2. Description of the Related Art

As we know, there are different types, designs and shapes of hoppers for mining trucks and aggregates, in general, that are used to transport materials or ores of various grain sizes, particle sizes and densities, which makes the amount of cargo or tonnage for a same volume to vary depending on this latter parameter. The materials they are made of are in general structural steels and, in some cases, non-abrasive steels, depending on the application and loading system. This latter point varies from task to task, giving a better or worse condition based on the loading of material. Such is the case of unloading through a chute door or gate, which is a rather gradual and controlled loading, as opposed to a shock loading, such as in the case of a front loader that projects the load through the sides of the truck, thereby falling on the loading area or the opposite side of the hopper without the equipment operator's vision. This causes extensive damage to the welds used to join the sides and the floor or front floor.

According to the above, sturdier hoppers are needed due to current conditions and trends of mining, which are targeted at larger and high load capacity equipment with greater availability of equipment for maintenance. This requires high capacity and resistance hoppers, thus requiring a greater number of structures or materials that make it more resistant, and/or a greater thickness to resist shocks and increase thicknesses in order to improve availability as a result of wearing of the plates which are in contact with the material, and slippage of the aggregates at the time of purging.

The current requirements for these loading components or hoppers demand that they are more robust by increasing their own weight with a decrease in the weight of the transported material by removing load capacity from the equipment (trucks). On the other hand, if a lighter hopper is made, i.e., by sacrificing thicknesses and materials of their structure, more frequent maintenances or replacements are needed or generated, and a decline in the availability of equipment due to frequent maintenance is confronted. Both scenarios are not what users are looking for. Rather, users desire a balance of load, shock and abrasion resistant in a light hopper having a greater availability respect to corrective maintenances.

The present invention is based on the use of technologically advanced or latest generation elements to be able to meet the demand of a greater load capacity and a longer service life due to the floor abrasion, satisfying the availability requirement of the client and the objectives set by the current market.

To meet the resistance and availability requirements, currently there are special steels, which are structurally more resistant ranging from 300 megapascals (MPa) to 700 MPa, depending on the type and origin. In contrast to the related art, the present invention proposes to (1) use steels with improved mechanical properties, (2) make a structure with an equal or greater resistance without increasing the thicknesses of the materials, since their densities do not vary much, and (3) create a design with the computer design methods and tools available in the market, thereby simplifying the structure by virtually analyzing the same in a quick and safe manner. This will allow the making of folded steels in critical areas of the hopper, thereby making it more resistant. In order to create these folds, more powerful and accurate equipment are required, forcing the use of high capacity folding technology and CNC (computer numerical control) controls. Also, given the size of the steel pieces, more power is required to fold them due to their special properties.

On the other hand, to prevent abrasive wearing, abrasion resistant steels are used. Such steels have hardness ranging from current 200 Brinell to 450 and/or 500 or more, with the capacity to significantly increase service life from wearing. However, such steels also have resistances ranging from 800 MPa to 1400 MPa and more, having more reason to use equipment more robust than traditional ones. As mentioned above, this allows the offering of a highly resistant and available product for production, but with a low weight in its structure. This allows a greater amount of load to be transported, and decreases the amount of fuel consumption, which, in large equipment can be very expensive.

Traditional manufacturing of hoppers is based on heavy structures with standard market folds or beams. In some cases there are special materials in terms of design, but they do not meet the above objectives. In the case of light hoppers, they have a lower weight in order to not affect the truck capacity. However, such hoppers have a shorter service life as a result of shocks and/or abrasion forcing to stop the equipment for more frequent maintenances.

In the case of non-abrasive steel applications, these are applied in their natural form as unfolded plates given their high resistance properties and the difficulty in making them with standard methods.

Accordingly, there is a need for an improved hopper for mining trucks and aggregates that use steels with improved mechanical properties, comprise a structure with an equal or greater resistance without increasing the thicknesses of the materials, since their densities do not vary much, and are designed using the computer design methods and tools available in the market, thereby simplifying the structure by virtually analyzing the same in a quick and safe manner. Further, there is also a need for an improved hopper which prevents the accumulation of material due to the wide radius of folding of the base plate in the areas of the floor with the front and the floor with the sides.

SUMMARY OF THE INVENTION

This utility model relates to a hopper for transportation of mineral or aggregates which prevents the material from falling off due to movements or slope, and which improves load performance and facilitates the download. In the joining areas between the front and the floor and between the sides and the floor there are folded or cylindered pieces giving curvature to such joining points, thus adding anti-adherent features to this hopper. The front is folded with a wide radius, also achieving an anti-adherent feature. There are also folds in the front and the shield to avoid beams in those areas of the hopper, thus decreasing the total weight of such hopper and reducing the appearance of cracks and lessening the amount of welding.

This invention also relates to a hopper which, by design, prevents the accumulation of material due to the wide radius of folding of the base plate in the areas of the floor with the front and the floor with the sides. Such a hopper considers the unloading area with a wider material release angle, thereby decreasing release times. Another feature of the hopper according to the invention is that it removes the beams in the front and in the shield by applying folds directly to the base plate, thus reducing the cracking problems that occur in the prior models. A lower welding application is also obtained by removing the beams, thus decreasing stress points, increasing resistance due to the application of folds, and reducing the overall weight of the hopper. Thus, a lower frequency of maintenance is obtained. Furthermore, the hopper has no or minimal spillage problems in twelve degree (12°) steep climbs or stability problems in curve areas.

According to the invention, this new hopper preferably has in its joining area between the front and the floor some folded or cylindered or cylindrically curved pieces. The front is folded with a wide radius with an anti-adherent feature. In the joining point between the sides and the floor, there are also these folded or cylindered pieces to obtain radii in the joining points to achieve anti-adherent properties or features. Also, it is preferred that the hopper release area be wider than the front to allow a better sliding of the material. In general, this is a hopper which does not allow the load to fall off due to slopes or sudden movements of the truck (i.e., anti-carry back). It is also preferred that in the hopper according to the invention the beams in the front and in the shield are removed due to the folds applied directly to the base plate, thus decreasing stress points, increasing resistance due to the application of folds, and reducing the overall weight of the hopper.

A hopper for transportation of mineral or aggregates which prevents the material from falling off due to slope movements, and which improves load performance and facilitates the release, wherein in the joining area between the front and the floor are folded or cylindered pieces giving curvature to such joining point, thus adding anti-adherent features to this hopper; wherein in the joining area between the sides and the floor, there are folded or cylindered pieces giving curvature to such joining point, thus adding anti-adherent features to this hopper; wherein the front is folded with a wide radius, also achieving an anti-adherent feature; wherein there are folds in the front and the shield to avoid beams in those areas of the hopper, thus decreasing the total weight of such hopper and reducing the appearance of cracks and lessening the amount of welding; and wherein the release area is wider to allow for a better sliding of the material.

The above and other aspects, features and advantages of the present invention will become apparent from the following description read in conjunction with the accompanying drawings, in which like reference numerals designate the same elements.

BRIEF DESCRIPTION OF THE DRAWINGS

A further understanding of the present invention can be obtained by reference to a preferred embodiment set forth in the illustrations of the accompanying drawings. Although the illustrated preferred embodiment is merely exemplary of methods, structures and compositions for carrying out the present invention, both the organization and method of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which.

DETAILED DESCRIPTION OF THE PREFERRED EMBODIMENTS

Figure 1:
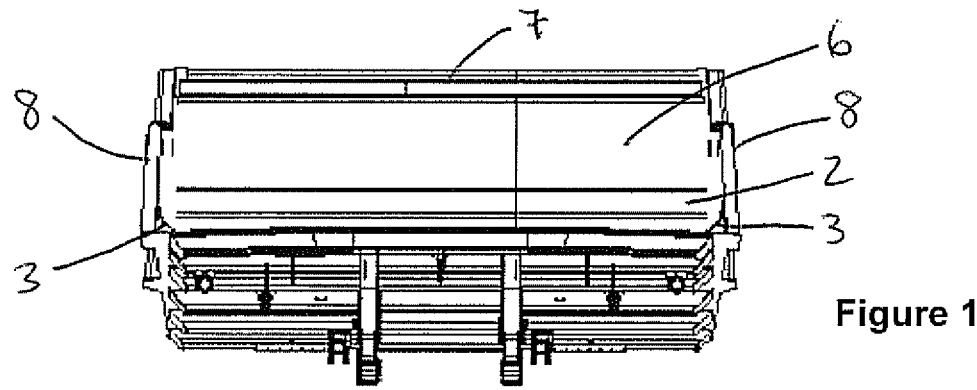
FIG. 1 shows a rear view of the hopper in accordance with the preferred embodiment of the invention.
Figure 2:
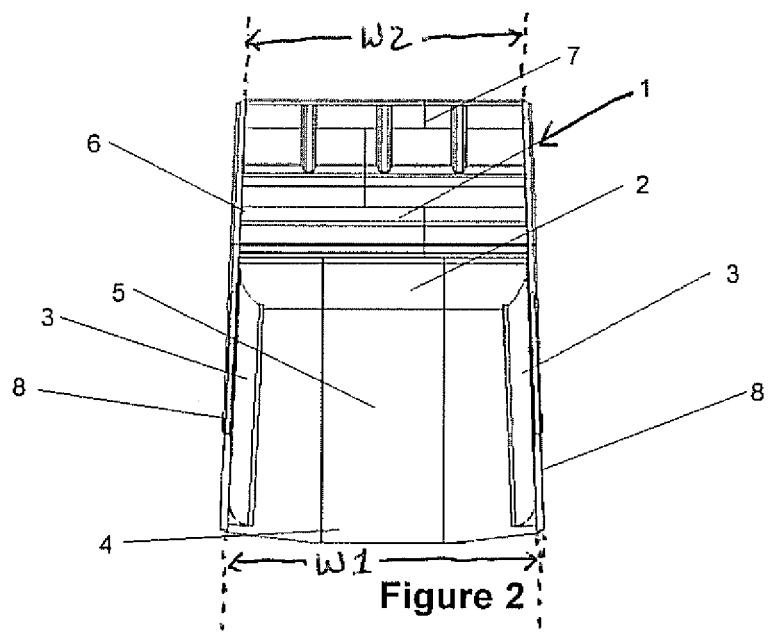
FIG. 2 shows a top plan view of the hopper according to the invention.
Figure 3:
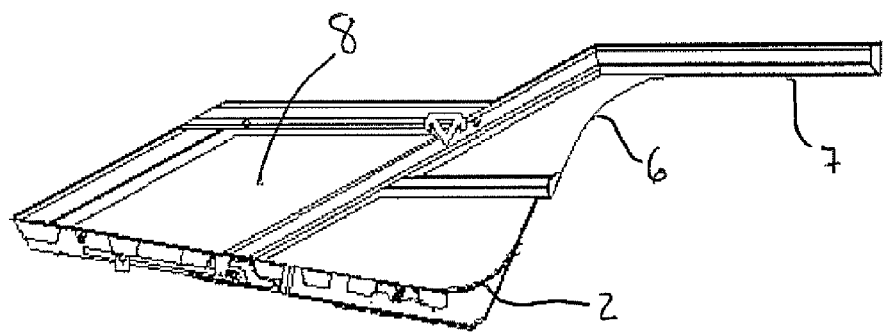
FIG. 3 shows a side elevation view of the hopper according to the invention.

As required, a detailed illustrative embodiment of the present invention is disclosed herein. However, techniques, systems, compositions and operating structures in accordance with the present invention may be embodied in a wide variety of sizes, shapes, forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention.

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, up, down, over, above, below, etc., or motional terms, such as forward, back, sideways, transverse, etc. may be used with respect to the drawings. These and similar directional terms should not be construed to limit the scope of the invention in any manner.

Referring to FIGS. 1-4, shown is a preferred embodiment of a hopper according to the present invention. As depicted, hopper 1 is for the transportation of minerals or aggregates and is such that it prevents the material from falling off due to movements or slope, and which improves load performance and facilitates the download. Preferably, in the joining areas between the front 6 and the floor 5 and between the sides 8 and the floor 5 there are folded or cylindered pieces 3 giving curvature to such joining points. Optionally, the front 6 is folded with a wide radius to achieve an anti-adherent feature. There are also folds in the front 6 and the shield 7 to avoid beams in those areas of the hopper 1, thus decreasing the total weight of hopper 1 and reducing the appearance of cracks and lessening the amount of welding.

The present invention also relates to a hopper 1 which, by design, prevents the accumulation of material due to the wide radius of folding of the base plate in the areas of the floor 5 with the front 6 and the floor 5 with the sides 8. Such a hopper 1 considers the unloading area with a wider material release angle, thereby decreasing release times. Another feature of the hopper 1 according to the invention is that it removes the beams in the front 6 and in the shield 7 by applying folds directly to the base plate, thus reducing the cracking problems that occur in the prior models. A lower welding application is also obtained by removing the beams, thus decreasing stress points, increasing resistance due to the application of folds, and reducing the overall weight of the hopper 1. Thus, a lower frequency of maintenance is obtained. Furthermore, the hopper 1 has no or minimal spillage problems in 12° steep climbs or stability problems in curve areas.

This new hopper 1 has in its joining area between the front 6 and the floor 5 some folded or cylindered pieces 2, the front 6 is folded with a wide radius with an anti-adherent feature. In the joining point between the sides 8 and the floor 5, there are also these folded or cylindered pieces (3) to obtain radii in the joining points to achieve a further anti-adherent feature. In the hopper release area 4, this is wider to allow a better sliding of the material. In general, this is a hopper which does not allow the load to fall off due to slopes or sudden movements of the truck (anti-carry back). This hopper removes the beams in the front 6 and the shield 7 by applying folds directly to the base plate.

Hopper 1 is primarily designed for the transportation of mineral or aggregates and which prevents the material from falling off due to slope movements, and which improves load performance and facilitates the release, wherein in the joining area between the front 6 and the floor 5 are folded or cylindered pieces 2 giving curvature to such joining point; wherein in the joining area between the sides 8 and the floor 5 are folded or cylindered pieces 3 giving curvature to such joining point; wherein the front 6 is folded with a wide radius; wherein there are folds in the front 6 and the shield 7 to avoid beams in those areas of the hopper 1; and wherein the release area has a width W1 which is wider than the width W2 of the shield region 7 to allow for a better sliding of the material upon unloading.

Figure 4:
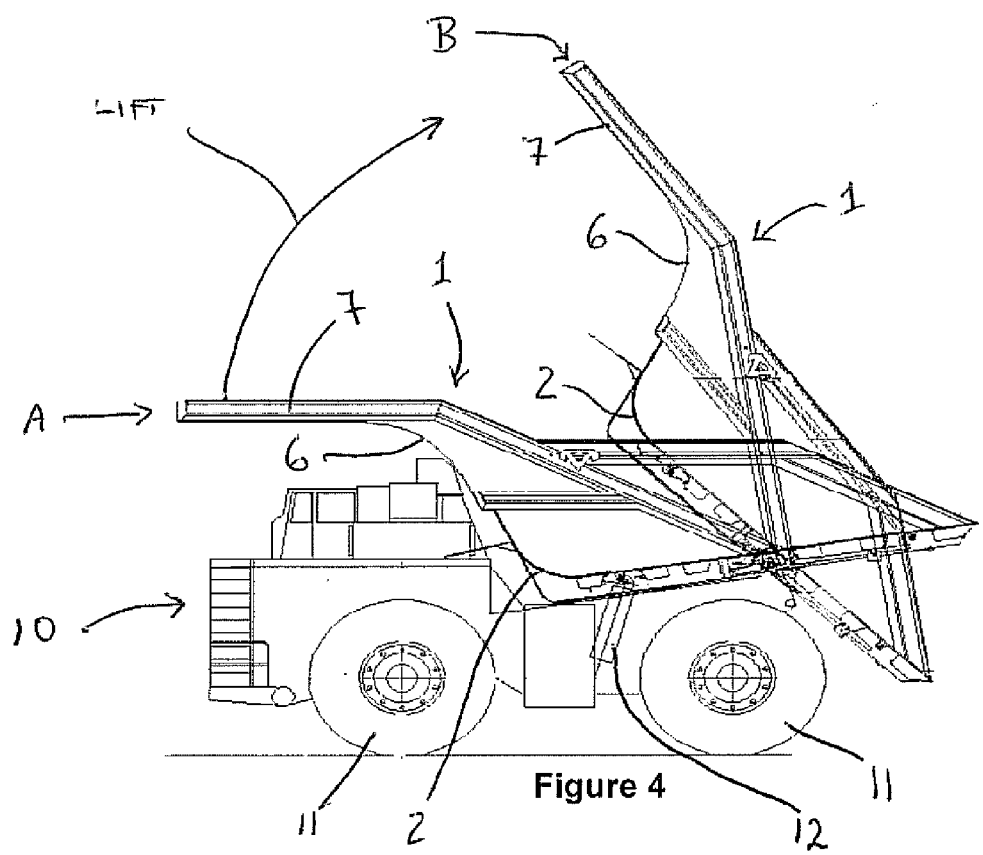
FIG. 4 shows a side elevation view of a truck with the hopper according to the invention in a loaded position (A) and an unloading position (B).

Additionally, as will be noted in reference to FIG. 4, an exemplary truck 10 includes a plurality of tires 11, as shown on a truck body (shown but not numbered), and the hopper 1 is tiltable relative thereto via a lifting mechanism 12, as shown. Those of skill in the art, having studied the disclosure herewith, will recognize that a variety of trucks 1, tires 11, and lifting mechanism 12 may be employed without departing from the scope and spirit of the present invention.

In the claims, means or step-plus-function clauses are intended to cover the structures described or suggested herein as performing the recited function and not only structural equivalents but also equivalent structures. Thus, for example, although a nail, a screw, and a bolt may not be structural equivalents in that a nail relies on friction between a wooden part and a cylindrical surface, a screw's helical surface positively engages the wooden part, and a bolt's head and nut compress opposite sides of a wooden part, in the environment of fastening wooden parts, a nail, a screw, and a bolt may be readily understood by those skilled in the art as equivalent structures.

Having described at least one of the preferred embodiments of the present invention with reference to the accompanying drawings, it is to be understood that such embodiments are merely exemplary and that the invention is not limited to those precise embodiments, and that various changes, modifications, and adaptations may be effected therein by one skilled in the art without departing from the scope or spirit of the invention as defined in the appended claims. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

What is claimed is:

1. A hopper for transportation of mineral or aggregates, said hopper preventing material from falling off due to slope movements and improving load performance and facilitating the release, wherein said hopper comprises:
    a) in an area joining a front portion and a floor portion there are folded pieces providing curvature to such joining area, wherein the hopper front is folded with a wide radius;
    b) in an area joining a first side portion and said floor portion there are folded pieces providing curvature to such joining area; and
    c) in an area joining a second side portion and said floor portion there are folded pieces providing curvature to such joining area;
        wherein folds in said front avoid a need for beams in said front of said hopper, and wherein an area of release in said hopper is wider than said front of said hopper to allow for a better sliding of the material upon unloading.

2. The apparatus of claim 1, wherein said hopper has a rear gate.

3. The apparatus of claim 1, wherein said hopper has a shield portion.

4. The apparatus of claim 3, wherein an area between said shield portion and said front is folded.

5. The apparatus of claim 4, wherein said folded pieces are cylindered in configuration.

6. The apparatus of claim 1, wherein said curvatures provide an anti-adhesive feature.

7. The apparatus of claim 1, wherein said hopper is connected to a truck with a lifting mechanism.

8. The apparatus of claim 1, wherein said folded pieces are cylindered in configuration.

* * * * *